Patented Sept. 7, 1926.

1,598,697

UNITED STATES PATENT OFFICE.

WILLIAM R. BARGER AND LON A. HAWKINS, OF WASHINGTON, DISTRICT OF COLUMBIA, ASSIGNORS, BY MESNE ASSIGNMENTS, TO THE PEOPLE OF THE UNITED STATES.

PROCESS FOR THE TREATMENT OF FRUIT FOR THE PREVENTION OF DECAY.

No Drawing. Application filed January 25, 1926. Serial No. 83,705.

(GRANTED UNDER THE ACT OF MARCH 3, 1883; 22 STAT. L. 625.)

This application is made under the act of March 3, 1883, Chapter 143 (22 Stat. 625) and the invention herein described and claimed may be used by the Government of the United States or any of its officers or employees in the prosecution of work for the Government, or any person in the United States, without payment to us of any royalty thereon.

The object of the invention is the prevention of green mold decay caused by *Penicillium digitatum Sacc.* of citrus fruits.

This invention consists of a process of treating fruit, particularly citrus fruit, with a compound formed by dissolving borax and boric acid in water in the proportion approximating one part of borax to two parts of boric acid. This compound is readily soluble in cold water and will remain in solution in concentrations up to about 8 parts of the compound, to 100 parts of water at a temperature of 35° F. the solubility decreasing as the temperature is lowered. It is, however, much more soluble than either borax or boric acid alone, the solubility of borax being 6 parts per 100 in cold water, while boric acid is soluble up to about 4 parts in 100 parts cold water. There is then no danger of this compound settling or crystallizing out of the solution at any temperature above the freezing point of the solution when used in concentration much higher than that necessary to completely control the disease. It has been shown that a concentration of this compound of 3 parts in 100 parts of cold water prevents the growth of the common green mold of oranges and lemons caused by *Penicillium digitatum Sacc.* if the fruit infected with this fungus is soaked in the solution. An exposure of one minute in a solution of this compound in concentration of one part to 100 parts of water gives partial control of the disease but longer applications or higher concentrations are more effective.

The treatment with the above described solution is accomplished by immersing, submerging, or causing the fruit to travel through a receptacle or tank containing this solution in such a manner that the entire surface of the fruit is wet with the solution. The apparatus described by Barger, Hukill, and Hawkins in United States Patent Serial No. 1,559,733, dated Nov. 7, 1925, is used for this purpose.

We claim:

A process for the prevention of decay of fruits by green mold caused by *Penicillium digitatum Sacc.* consisting in the treatment of such fruits with a compound of borax and boric acid in the proportion of approximately one part borax to two parts boric acid, dissolved in water at concentration of one to 8 parts of this compound to 100 parts of water.

WILLIAM R. BARGER.
LON A. HAWKINS.